US011685339B2

(12) United States Patent
Sato et al.

(10) Patent No.: US 11,685,339 B2
(45) Date of Patent: Jun. 27, 2023

(54) VEHICLE, AUTHENTICATION SYSTEM, NON-TRANSITORY COMPUTER READABLE MEDIUM, AND AUTHENTICATION METHOD

(71) Applicant: Toyota Jidosha Kabushiki Kaisha, Toyota (JP)

(72) Inventors: Aya Sato, Miyoshi (JP); Kuniaki Jinnai, Nagoya (JP); Taiki Yamashita, Toyota (JP); Eduard Vandersmitte, McKinney, TX (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/397,254

(22) Filed: Aug. 9, 2021

(65) Prior Publication Data
US 2022/0048470 A1 Feb. 17, 2022

(30) Foreign Application Priority Data
Aug. 11, 2020 (JP) .................................. 2020-136061

(51) Int. Cl.
| | |
|---|---|
| *B60R 25/25* | (2013.01) |
| *B60R 25/01* | (2013.01) |
| *G06Q 20/40* | (2012.01) |
| *G06F 21/32* | (2013.01) |
| *G06V 40/16* | (2022.01) |

(52) U.S. Cl.
CPC .............. *B60R 25/25* (2013.01); *B60R 25/01* (2013.01); *G06F 21/32* (2013.01); *G06Q 20/40145* (2013.01); *G06V 40/172* (2022.01); *G06F 2221/2137* (2013.01)

(58) Field of Classification Search
CPC ...... B60R 25/25; B60R 25/01; G06V 40/172; G06F 21/32; G06F 2221/2137; G06Q 20/40145
See application file for complete search history.

(56) References Cited

U.S. PATENT DOCUMENTS

| | | | |
|---|---|---|---|
| 9,501,881 B2 * | 11/2016 | Saeedi | ................... G07C 9/257 |
| 10,504,094 B1 * | 12/2019 | Gaudin | .............. G06Q 20/3278 |
| 2011/0260831 A1 * | 10/2011 | Ieda | ...................... B60R 25/246 |
| | | | 340/5.64 |
| 2015/0203125 A1 | 7/2015 | Penilla et al. | |

(Continued)

FOREIGN PATENT DOCUMENTS

| | | |
|---|---|---|
| JP | 2017-001615 A | 1/2017 |
| JP | 2018084109 A | 5/2018 |

*Primary Examiner* — Thomas D Alunkal
(74) *Attorney, Agent, or Firm* — Dinsmore & Shohl LLP

(57) ABSTRACT

A vehicle includes a communication interface, a sensor configured to detect biological information for a user of the vehicle, and a controller configured to perform electronic payments. The controller receives authentication information from a first terminal apparatus using the communication interface and acquires the biological information from the sensor when a first authentication using the received authentication information succeeds. The controller acquires authorization information indicating authorization to perform an electronic payment for the user, who is associated with the authentication information, when a second authentication using the acquired biological information succeeds.

19 Claims, 5 Drawing Sheets

(56) References Cited

U.S. PATENT DOCUMENTS

| | | | |
|---|---|---|---|
| 2015/0363986 A1* | 12/2015 | Hoyos | G07C 9/00563 |
| | | | 340/5.61 |
| 2016/0300050 A1* | 10/2016 | Hecht | H04W 12/06 |
| 2017/0272418 A1* | 9/2017 | Kim | H04L 63/08 |
| 2018/0151011 A1 | 5/2018 | Ichida | |
| 2019/0039570 A1* | 2/2019 | Foster | B60R 25/25 |
| 2019/0362565 A1* | 11/2019 | Zhang | G06Q 20/40 |
| 2021/0019385 A1* | 1/2021 | Stein | G06F 21/32 |
| 2021/0027410 A1* | 1/2021 | Jiao | G01C 21/3438 |

\* cited by examiner

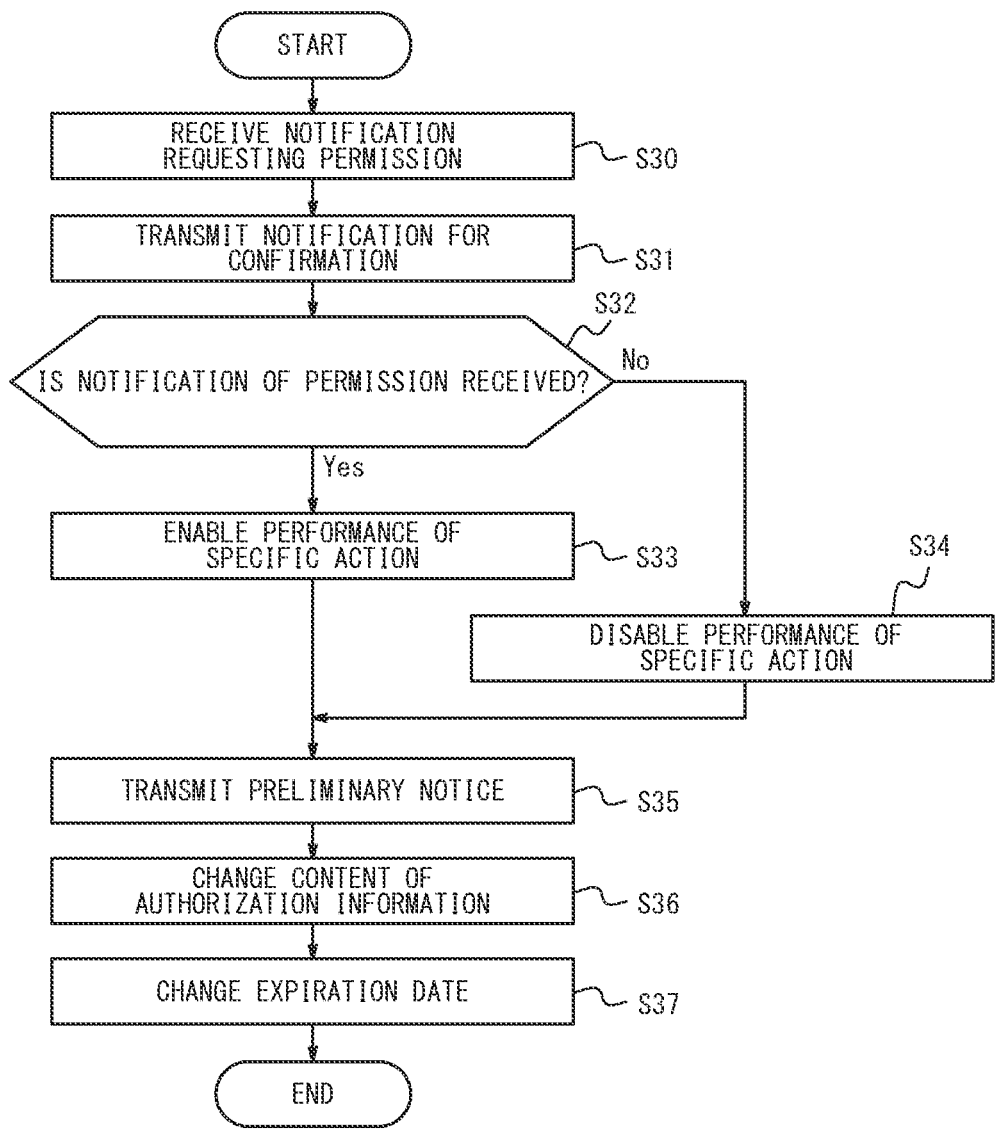

VEHICLE, AUTHENTICATION SYSTEM, NON-TRANSITORY COMPUTER READABLE MEDIUM, AND AUTHENTICATION METHOD

CROSS-REFERENCE TO RELATED APPLICATION

This application claims priority to Japanese Patent Application No. 2020-136061, filed Aug. 11, 2020, the entire contents of which are incorporated herein by reference.

TECHNICAL FIELD

The present disclosure relates to a vehicle, an authentication system, a non-transitory computer readable medium, and an authentication method.

BACKGROUND

Technology for performing authentication in a vehicle is known. For example, see patent literature (PTL) 1. PTL 1 discloses an authentication apparatus mounted in a vehicle.

CITATION LIST

Patent Literature

PTL 1: JP 2017-001615 A

SUMMARY

Known technology for performing authentication in a vehicle has room for improvement.

It would be helpful to improve technology for performing authentication in a vehicle.

A vehicle according to the present disclosure includes a communication interface, a sensor configured to detect biological information for a user of the vehicle, and a controller configured to perform electronic payments. The controller is configured to receive authentication information from a first terminal apparatus using the communication interface and acquire the biological information from the sensor when a first authentication using the received authentication information succeeds, and acquire authorization information indicating authorization to perform an electronic payment for the user, who is associated with the authentication information, when a second authentication using the acquired biological information succeeds.

A program according to the present disclosure is executable by a computer to cause the computer to execute operations including receiving authentication information from a first terminal apparatus and acquiring biological information for a user when a first authentication using the received authentication information succeeds, and acquiring authorization information indicating authorization to perform an electronic payment for the user, who is associated with the authentication information, when a second authentication using the acquired biological information succeeds.

An authentication method according to the present disclosure includes receiving, by a vehicle, authentication information from a first terminal apparatus and acquiring biological information for a user when a first authentication using the received authentication information succeeds, and acquiring, by the vehicle, authorization information indicating authorization to perform an electronic payment for the user, who is associated with the authentication information, when a second authentication using the acquired biological information succeeds.

According to the present disclosure, technology for performing authentication in a vehicle can be improved.

BRIEF DESCRIPTION OF THE DRAWINGS

In the accompanying drawings:

FIG. 5 is a flowchart illustrating operations for processing to permit a specific action and processing for updating in the authentication system illustrated in FIG. 1.

DETAILED DESCRIPTION

Figure 1:
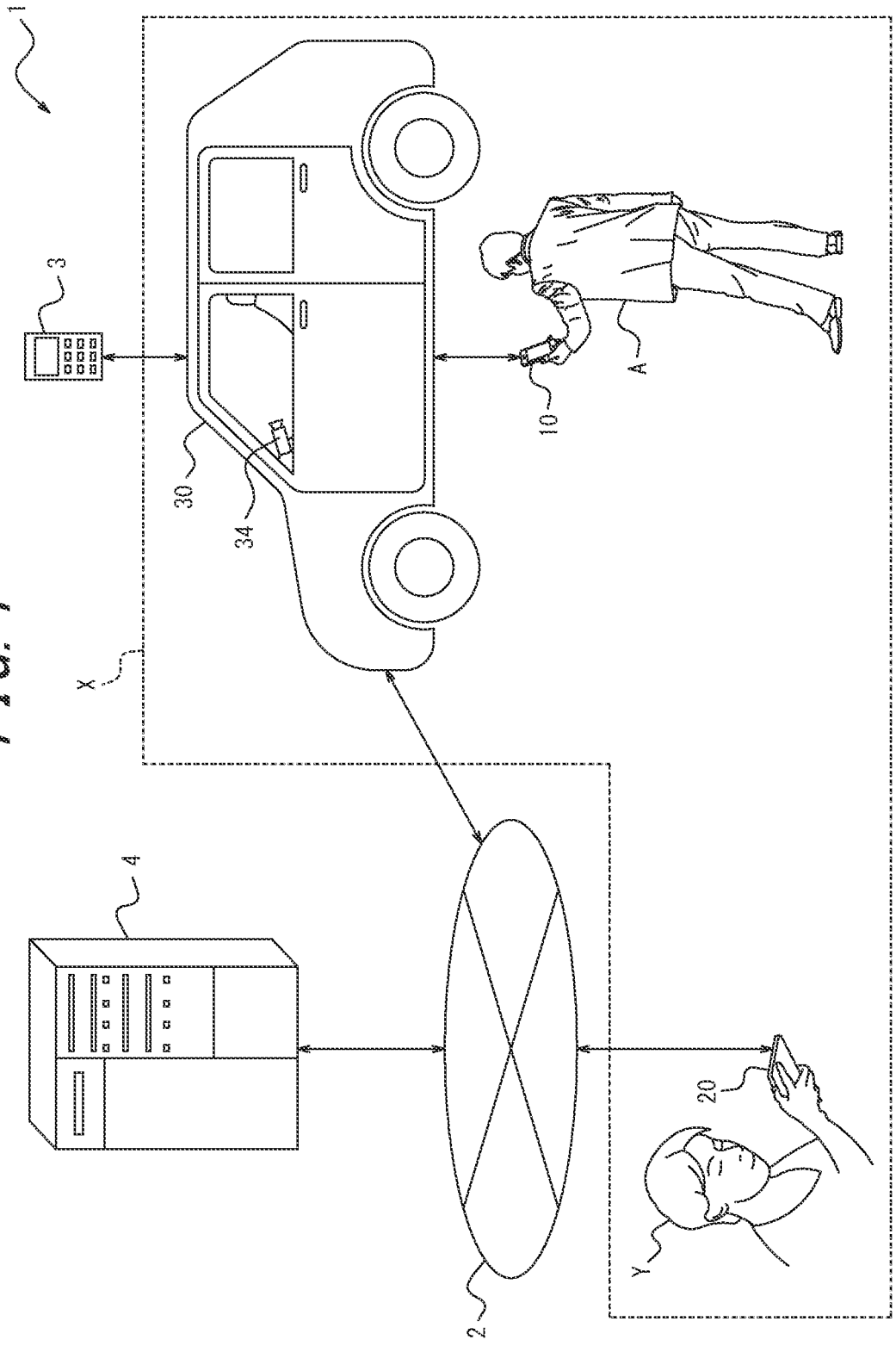
FIG. 1 is a diagram illustrating a configuration of an authentication system according to an embodiment of the present disclosure.

An embodiment of the present disclosure will be described below, with reference to the drawings. Among the components illustrated in the following drawings, identical components are denoted by the same reference numerals.

(Authentication System Configuration)

As illustrated in FIG. 1, the authentication system 1 according to an embodiment of the present disclosure includes a first terminal apparatus 10, a second terminal apparatus 20, and a vehicle 30.

The first terminal apparatus 10 and the vehicle 30 can communicate directly by short-range wireless communication. Examples of short-range wireless communication include Near Field Communication (NFC) and Bluetooth® (Bluetooth is a registered trademark in Japan, other countries, or both). The second terminal apparatus 20 and the vehicle 30 can communicate via the network 2. The network 2 may be any appropriate network, such as a mobile object communication network or the Internet.

The first terminal apparatus 10 can be used by user A. User A is, for example, an employee of company X. User A can drive the vehicle 30, which is a company car of company X, while working. User A can unlock the doors of the vehicle 30 by operating the first terminal apparatus 10. The first terminal apparatus 10 may be any appropriate device that can directly communicate with the vehicle 30. The first terminal apparatus 10 is, for example, a cellular phone, a smartphone, a tablet, a personal computer (PC), or the like.

The second terminal apparatus 20 can be used by user Y. User Y can work at company X. The position of user Y in company X is higher than that of user A in company X. By operating the second terminal apparatus 20, user Y can set the authorization of user A in the vehicle 30, as described below. The second terminal apparatus 20 may be any appropriate device that can connected to the network 2. The second terminal apparatus 20 is, for example, a cellular phone, a smartphone, a tablet, a PC, or the like.

The vehicle 30 can, for example, be operated as a company car of company X. The vehicle 30 can, for example, be operated by user A. The vehicle 30 can perform electronic payments by communicating with the communication apparatus 3 by short-range wireless communication. While riding in the vehicle 30, user A can purchase goods or the like by an electronic payment performed by the vehicle 30. The communication apparatus 3 may be any appropriate device capable of performing electronic payments. The communication apparatus 3 may be located at any appropriate location corresponding to a transaction target, such as goods or services, to be paid for by an electronic payment. The communication apparatus 3 is, for example, located at a filling station such as a gas station, the toll gate of a pay parking lot or a toll road, or the like.

The vehicle 30 may be any appropriate type of automobile. The vehicle 30 is, for example, a gasoline-powered vehicle, diesel-powered vehicle, a hybrid vehicle (HV), a plug-in hybrid vehicle (PHV), an electric vehicle (EV), a fuel cell vehicle (FCV), or the like. The driving of the vehicle 30 may be automated at any level. The level of automation is, for example, one of level 1 to level 5 according to the classification of the Society of Automotive Engineers (SAE). The vehicle 30 may be a Mobility as a Service (MaaS) dedicated vehicle.

Figure 2:
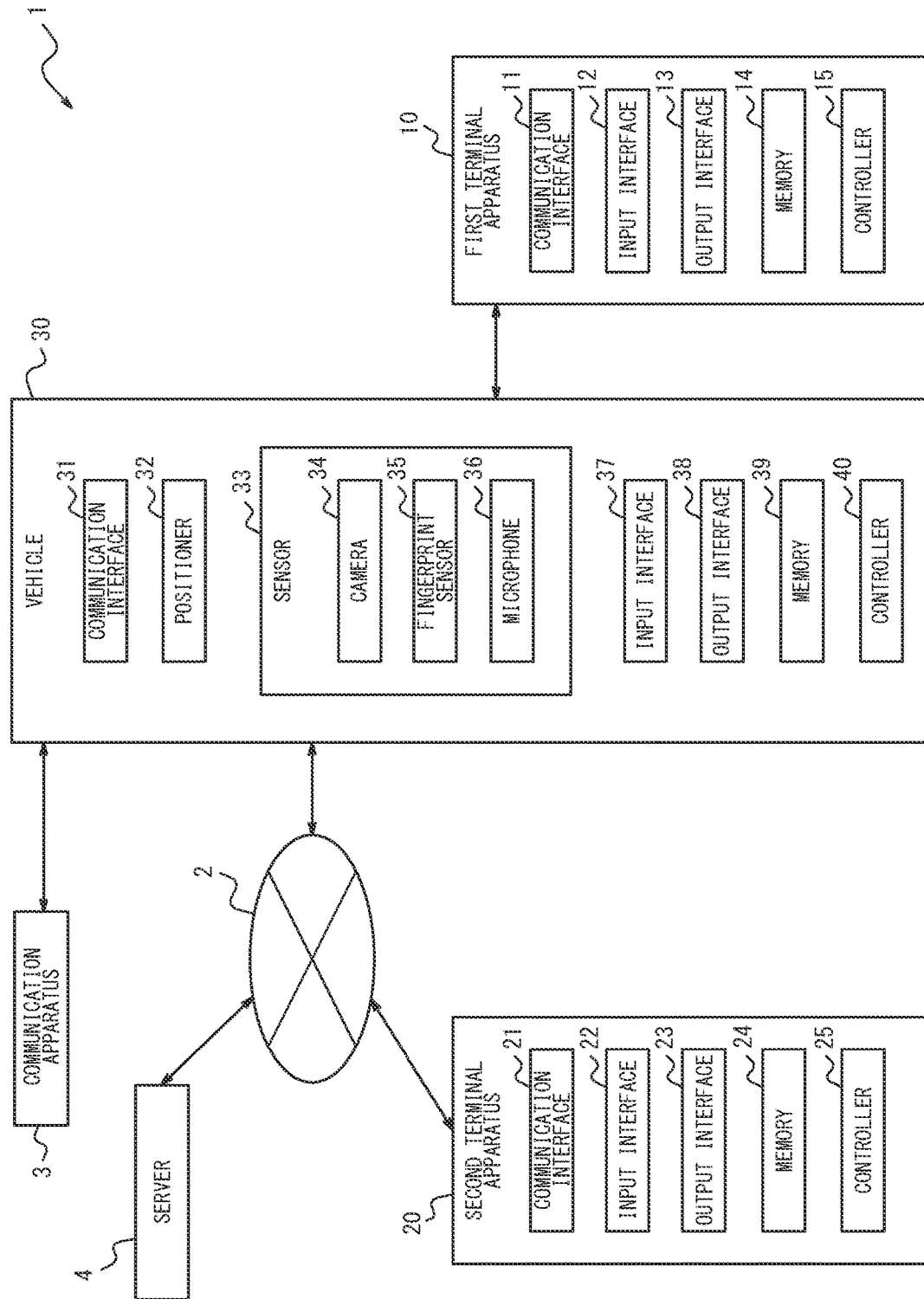
FIG. 2 is a block diagram illustrating a detailed configuration of the authentication system illustrated in FIG. 1.

As illustrated in FIG. 2, the first terminal apparatus 10 includes a communication interface 11, an input interface 12, an output interface 13, a memory 14, and a controller 15.

The communication interface 11 can be configured to include at least one communication module connectable to the network 2. The communication module is a communication module conforming to a mobile object communication standard such as Long Term Evolution (LTE), 4th Generation (4G), or 5th Generation (5G). The communication interface 11 can be further configured to include a communication module corresponding to short-range wireless communication.

The input interface 12 can receive input from user A. The input interface 12 can receive input from user A based on control by the controller 15. The input interface 12 can be configured to include at least one interface for input that can receive input from user A. The interface for input may be a physical key, a capacitive key, a pointing device, a touch screen integrally provided with a display, a microphone, or the like.

The output interface 13 can output data. The output interface 13 can output data based on control by the controller 15. The output interface 13 can be configured to include at least one interface for output that can output data. The interface for output may be a display, a speaker, or the like. The display may be a liquid crystal display (LCD), an organic electro luminescence (EL) display, or the like.

The memory 14 can be configured to include at least one semiconductor memory, at least one magnetic memory, at least one optical memory, or a combination of at least two of these. The semiconductor memory is, for example, random access memory (RAM) or read only memory (ROM). The RAM is, for example, static random access memory (SRAM), dynamic random access memory (DRAM), or the like. The ROM is, for example, electrically erasable programmable read only memory (EEPROM) or the like. The memory 14 may function as a main memory, an auxiliary memory, or a cache memory. The memory 14 stores data to be used for the operations of the first terminal apparatus 10 and data resulting from the operations of the first terminal apparatus 10. For example, the authentication information for user A is stored in the memory 14.

The controller 15 can be configured to include at least one processor, at least one dedicated circuit, or a combination thereof. Examples of the processor include a general-purpose processor such as a CPU or a graphics processing unit (GPU) and a dedicated processor dedicated to specific processing. Examples of dedicated circuits can include a Field-Programmable Gate Array (FPGA) and an Application Specific Integrated Circuit (ASIC). The controller 15 can execute processes related to operations of the first terminal apparatus 10 while controlling each component of the first terminal apparatus 10.

The functions of the first terminal apparatus 10 can be realized by execution of a first terminal program according to the present embodiment by a processor corresponding to the controller 15. That is, the functions of the first terminal apparatus 10 can be realized by software. The first terminal program can cause a computer to execute the operations of the first terminal apparatus 10, thereby causing the computer to function as the first terminal apparatus 10. That is, the computer can execute the operations of the first terminal apparatus 10 in accordance with the first terminal program to function thereby as the first terminal apparatus 10.

In the present disclosure, a "program" can be recorded on a non-transitory computer readable recording medium. The non-transitory computer readable recording medium is, for example, a magnetic recording device, an optical disc, a magneto-optical recording medium, or ROM. The program is distributed by, for example, the selling, transferring, or lending of a portable recording medium such as a Digital Versatile Disc (DVD) or a Compact Disc Read Only Memory (CD-ROM) on which the program is recorded. The program may be stored in the storage of a server. The program stored in the storage of the server may be distributed by being transferred to another computer. The program may be provided as a program product.

In the present disclosure, a "computer" can temporarily store in a main memory, for example, a program recorded on a portable recording medium, or a program transferred from the server. Furthermore, the computer can read out the program stored in the main storage device using a processor and execute processing according to the program thus read out. The computer may read a program directly from the portable recording medium and execute processes in accordance with the program. The computer may, each time a program is transferred from the server to the computer, sequentially execute processes in accordance with the received program. Instead of transferring a program from the server to the computer, the computer may execute processes by a so-called Application Service Provider (ASP) type service that realizes functions only by execution instructions and result acquisitions. The programs can include information that is to be used for processing by an electronic computer and is thus equivalent to a program. For example, data that is not a direct command to a computer but has a property that regulates processing of the computer is "equivalent to a program" in this context.

Some or all of the functions of the first terminal apparatus 10 may be realized by a dedicated circuit corresponding to the controller 15. That is, some or all of the functions of the first terminal apparatus 10 may be realized by hardware.

The controller 15 can transmit the authentication information in the memory 14 to the vehicle 30 by short-range wireless communication via the communication interface 11. For example, if the short-range wireless communication is NFC, then when using the vehicle 30, user A holds the communication interface 11 of the first terminal apparatus 10 over a preset location in the vehicle 30. By the communication interface 11 of the first terminal apparatus 10 being held over the corresponding portion of the vehicle 30, short-range wireless communication is enabled between the first terminal apparatus 10 and the vehicle 30.

As illustrated in FIG. 2, the second terminal apparatus 20 includes a communication interface 21, an input interface 22, an output interface 23, a memory 24, and a controller 25.

Like the communication interface 11, the communication interface 21 can be configured to include at least one communication module connectable to the network 2.

The input interface 22 can receive input from user Y. The input interface 22 can receive input from user Y based on control by the controller 15. Like the input interface 12, the input interface 22 can be configured to include at least one interface for input that can receive input from user Y.

The output interface 23 can output data. The output interface 23 can output data based on control by the controller 15. Like the output interface 13, the output interface 23 can be configured to include at least one interface for output that can output data.

Like the memory 14, the memory 24 can be configured to include at least one semiconductor memory, at least one magnetic memory, at least one optical memory, or a combination of at least two of these. The memory 24 may function as a main memory, an auxiliary memory, or a cache memory. The memory 24 stores data to be used for the operations of the second terminal apparatus 20 and data resulting from the operations of the second terminal apparatus 20.

Like the controller 15, the controller 25 can be configured to include at least one processor, at least one dedicated circuit, or a combination thereof. The controller 25 can execute processes related to operations of the second terminal apparatus 20 while controlling each component of the second terminal apparatus 20.

The functions of the second terminal apparatus 20 can be realized by execution of a second terminal program according to the present embodiment by a processor corresponding to the controller 25. That is, the functions of the second terminal apparatus 20 can be realized by software. The second terminal program can cause a computer to execute the operations of the second terminal apparatus 20, thereby causing the computer to function as the second terminal apparatus 20. That is, the computer can execute the operations of the second terminal apparatus 20 in accordance with the second terminal program to function thereby as the second terminal apparatus 20.

Some or all of the functions of the second terminal apparatus 20 may be realized by a dedicated circuit corresponding to the controller 25. That is, some or all of the functions of the second terminal apparatus 20 may be realized by hardware.

Details of the processing by the controller 25 are provided below.

As illustrated in FIG. 2, the vehicle 30 includes a communication interface 31, a positioner 32, a sensor 33, an input interface 37, an output interface 38, a memory 39, and a controller 40. The controller 40 may be a portion of an Electronic Control Unit (ECU) of the vehicle 30. The input interface and output interface of a car navigation system may be used as the input interface 37 and output interface 38.

Like the communication interface 11, the communication interface 31 can be configured to include at least one communication module connectable to the network 2. The communication interface 31 can be further configured to include a communication module corresponding to short-range wireless communication. If the short-range wireless communication is NFC, then a communication module corresponding to short-range wireless communication of the communication interface 31 may be positioned at a preset location in the vehicle 30 so that user A can hold the communication interface 11 of the first terminal apparatus 10 over the communication module.

Based on control by the controller 40, the positioner 32 acquires positional information for the vehicle 30. Based on control by the controller 40, the positioner 32 outputs the acquired positional information for the vehicle 30 to the controller 40. The positioner 32 can be configured to include at least one receiving module corresponding to a satellite positioning system. The receiving module is, for example, a receiving module corresponding to the Global Positioning System (GPS). The receiving module is not, however, limited to this example. The receiving module may be a receiving module corresponding to any appropriate satellite positioning system.

The sensor 33 can detect biological information for the user. Based on control by controller 40, the sensor 33 can detect the biological information for the user riding in the vehicle 30. The sensor 33 includes a camera 34, a fingerprint sensor 35, and a microphone 36. The sensors included in the sensor 33 are not limited to these sensors. The sensor 33 may include any sensor that can detect the biological information for the user. It suffices for the sensor 33 to include at least one sensor that can detect the biological information for the user.

The camera 34 can be configured to include an imaging device and imaging optics. The camera 34 can be located at a position such that the face of the user sitting in the driver's seat of the vehicle 30 can be the subject of imaging. For example, the dashboard of the vehicle 30 can serve as the position of the camera 34 such that the face of the user sitting in the driver's seat of the vehicle 30 can be the subject of imaging. Based on control by the controller 40, the camera 34 images the user's face as a subject and generates data of a facial image of the user. Based on control by the controller 40, the camera 34 outputs the generated data of the facial image of the user to the controller 40.

The fingerprint sensor 35 can be located at any appropriate position in the vehicle 30 where the user can place a fingertip. The fingerprint sensor 35 can generate a fingerprint image from the fingerprint pattern at the user's fingertip. The fingerprint sensor 35 may use any appropriate method such as a capacitive method, an optical method, or an ultrasonic method. The fingerprint sensor 35 generates the fingerprint image of the user based on control by the controller 40. The fingerprint sensor 35 outputs the generated data of the fingerprint image of the user to the controller 40 based on control by the controller 40.

The microphone 36 can be located at any position in the vehicle 30 where the microphone 36 can pick up speech uttered by the user. Based on control by the controller 40, the microphone 36 generates audio data by picking up the user's speech and converting the speech into an electrical signal. The microphone 36 outputs the audio data to the controller 40 based on control by the controller 40.

The input interface 37 can receive input from the user. The input interface 37 can receive input from the user based on control by the controller 40. Like the input interface 12, the input interface 37 can be configured to include at least one interface for input that can receive input from user.

The output interface 38 can output data. The output interface 38 can output data based on control by the controller 40. Like the output interface 13, the output interface 38 can be configured to include at least one interface for output that can output data.

Like the memory 14, the memory 39 can be configured to include at least one semiconductor memory, at least one magnetic memory, at least one optical memory, or a combination of at least two of these. The memory 39 may function as a main memory, an auxiliary memory, or a cache memory. The memory 39 stores data to be used for the operations of the vehicle 30 and data resulting from the operations of the vehicle 30.

As described below with reference to FIG. 3, authentication information, biological information, authorization information, and second account information, for example, are stored in the memory 39. An expiration date may be set in advance in the authentication information. Identification information for the user associated with the authentication information, for example, is stored in the memory 39. The identification information for the user is, for example, an employee number of the user in company X, the name of the user, or the like. First account information, described below, is also stored in the memory 39, for example.

Like the controller 15, the controller 40 can be configured to include at least one processor, at least one dedicated circuit, or a combination thereof. The controller 40 can execute processes related to operations of the vehicle 30 while controlling each component of the vehicle 30. The controller 40 may have a clock function to acquire the current time.

The functions of the vehicle 30 can be realized by execution of a vehicle program according to the present embodiment by a processor corresponding to the controller 40. That is, the functions of the vehicle 30 can be realized by software. The vehicle program can cause a computer to function as the vehicle 30 by causing the computer to execute operations of the vehicle 30. That is, the computer can function as the vehicle 30 by executing operations of the vehicle 30 in accordance with the vehicle program.

Some or all of the functions of the vehicle 30 may be realized by a dedicated circuit corresponding to the controller 40. That is, some or all of the functions of the vehicle 30 may be realized by hardware.

An example of processing by the controller 40 is described below.

<First Authentication Process>

The controller 40 can receive authentication information from the first terminal apparatus 10 by short-range wireless communication via the communication interface 31. As described above, if the short-range wireless communication is NFC, for example, then when using the vehicle 30, user A holds the communication interface 11 of the first terminal apparatus 10 over a preset location in the vehicle 30. When the communication interface 11 of the first terminal apparatus 10 is held over the corresponding portion of the vehicle 30, the controller 40 can start to perform short-range wireless communication between the first terminal apparatus 10 and the vehicle 30.

The controller 40 can perform a first authentication using the received authentication information. When the received authentication information matches any of the authentication information stored in the memory 39, the controller 40 may judge that the first authentication has succeeded. On the other hand, when the received authentication information does not match any of the authentication information stored in the memory 39, the controller 40 may judge that the first authentication has failed.

Figure 3:
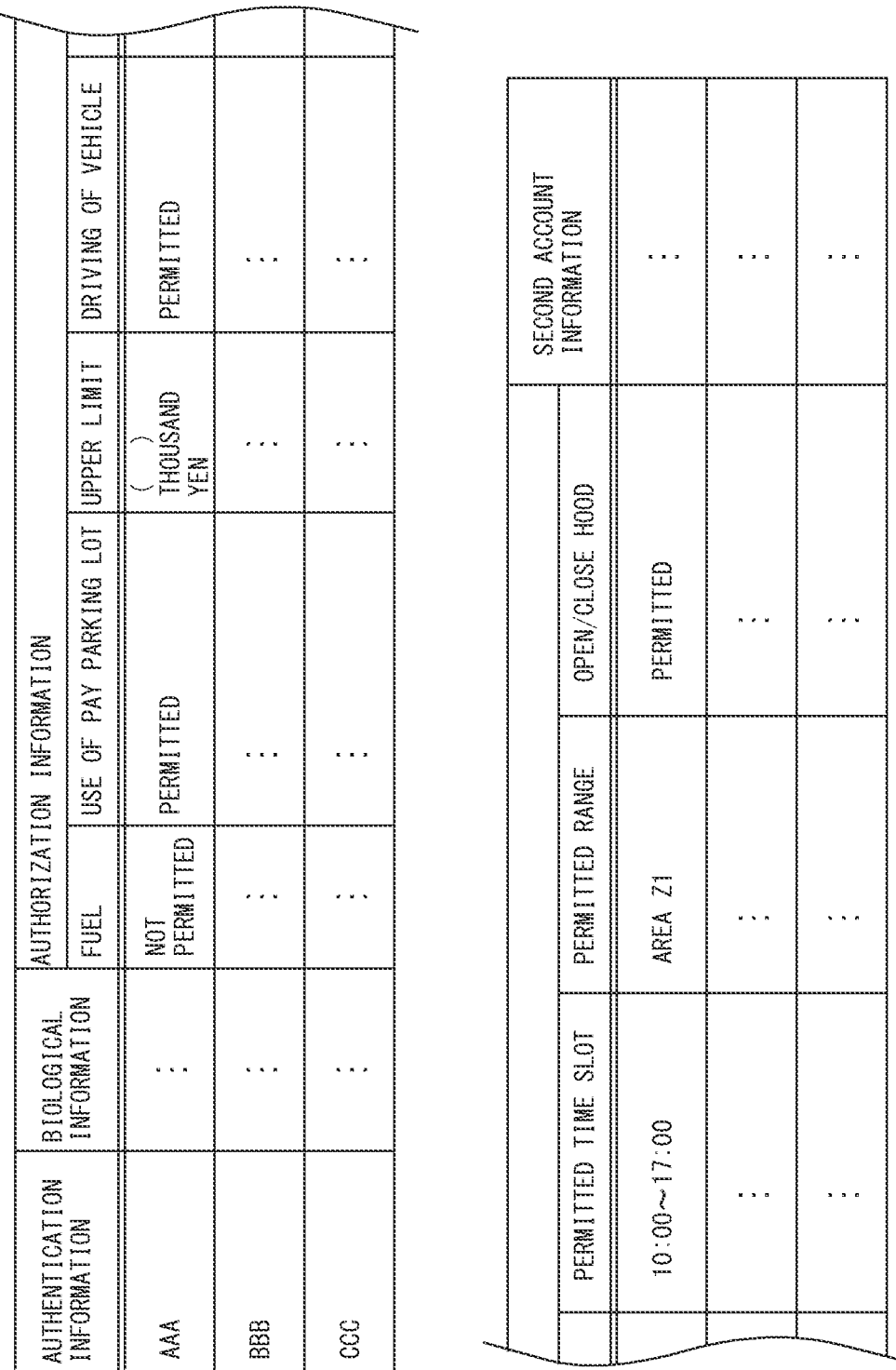
FIG. 3 is a diagram illustrating authorization information according to an embodiment of the present disclosure.

For example, as illustrated in FIG. 3, "AAA", "BBB", and "CCC" are stored in the memory 39 as authentication information. "AAA" is the authentication information for user A. "BBB" is the authentication information for user B. "CCC" is the authentication information for user C. User B and user C are different users from user A. In this case, when receiving the authentication information "AAA" from the first terminal apparatus 10, the controller 40 judges that the first authentication has succeeded.

The controller 40 may unlock the door of the vehicle 30 when the first authentication succeeds. By the door of the vehicle 30 being unlocked, user A can ride the vehicle 30. As a result of user A riding the vehicle 30, the sensor 33 can become capable of detecting the biological information for user A on-board the vehicle 30.

<Second Authentication Process>

When the first authentication succeeds, the controller 40 can acquire the biological information for the user on-board the vehicle 30 from the sensor 33. The controller 40 can perform a second authentication using the acquired biological information. In the second authentication, the controller 40 may acquire biological information, associated with the authentication information used in the first authentication, from the memory 39. Any biological information corresponding to the type of biological information detected by the sensor 33 may be associated with the authentication information stored in the memory 39. The controller 40 may judge whether the second authentication succeeds or fails based on the result of comparing the biological information acquired from the sensor 33 and the biological information acquired from the memory 39.

For example, when the sensor 33 includes the camera 34, the controller 40 can acquire, from the camera 34, the data of the facial image of the user sitting in the driver's seat of the vehicle 30 as the biological information for the user. In this case, data of the facial image is associated with the authentication information stored in the memory 39. The controller 40 judges whether the second authentication succeeds or fails based on the result of comparing the data of the facial image of the user acquired from the camera 34 with the data of the facial image acquired from the memory 39.

For example, when the sensor 33 includes the fingerprint sensor 35, the controller 40 can acquire, from the fingerprint sensor 35, data of a fingerprint image of a finger of the user on-board the vehicle 30. In this case, data of a fingerprint image is associated with the authentication information stored in the memory 39. The controller 40 may cause the output interface 38 to output the message "place your finger on the sensor" to acquire a fingerprint image using the fingerprint sensor 35. The controller 40 judges whether the second authentication succeeds or fails based on the result of comparing the data of the user's fingerprint image acquired from the fingerprint sensor 35 with the data of the fingerprint image acquired from the memory 39.

For example, when the sensor 33 includes the microphone 36, the controller 40 can acquire audio data for the user on-board the vehicle 30 from the microphone 36. In this case, audio data is associated with the authentication information stored in the memory 39. The controller 40 may cause the output interface 38 to output the message "please talk" to acquire audio data using the microphone 36. The controller 40 judges whether the second authentication succeeds or fails based on the result of comparing the audio data for the user acquired from the microphone 36 with the audio data acquired from the memory 39.

When the second authentication succeeds, the controller 40 can acquire authorization information associated with the authentication information, as illustrated in FIG. 3, from the memory 39. The authorization information may be information indicating authorization for electronic payments by the user identified by the authentication information. The content of the authorization information may be predetermined by company X or user Y.

The authorization information may include information on the transaction target for which the user is authorized to use an electronic payment. For example, the authorization information illustrated in FIG. 3 includes information on the use of the pay parking lot as a transaction target for which authorization for use of an electronic payment is granted to user A.

The authorization information may include information on the upper limit of the payment amount by an electronic payment. The upper limit of the payment amount may be the upper limit of the payment amount by one electronic payment or may be the upper limit of payment amounts by electronic payments in a preset period.

The authorization information may include information indicating whether to permit the user to drive the vehicle 30. For example, the authorization information illustrated in FIG. 3 indicates that user A is permitted to drive the vehicle 30. Here, at the point in time when the second authentication succeeds, the vehicle 30 is in a non-drivable state, since the power source such as the engine and motor of the vehicle 30 is in a suspended state. Upon acquiring the authorization information, the controller 40 may place the vehicle 30 in a drivable state when the authorization information indicates that the user is permitted to drive the vehicle 30. As an example of placing the vehicle 30 in the drivable state, the controller 40 may enable starting of the power source, such as the engine and motor of the vehicle 30. Conversely, upon acquiring the authorization information, the controller 40 may maintain the vehicle 30 in the non-drivable state when the authorization information indicates that the user is not permitted to drive the vehicle 30. As an example of placing the vehicle 30 in the non-drivable state, the controller 40 may maintain the power source, such as the engine and motor of the vehicle 30, in the suspended state.

The authorization information may include information on a time slot in which the user is permitted to drive the vehicle 30. For example, the authorization information illustrated in FIG. 3 includes information indicating 10:00 to 17:00 as the time slot during which user A is permitted to drive the vehicle 30. The controller 40 may place the vehicle 30 in the drivable state during the time slot in which user is permitted to drive the vehicle 30. The controller 40 may place the vehicle 30 in the suspended state when the current time is outside the permitted time slot and the vehicle 30 is not traveling, for example. The controller 40 may acquire the current time using the clock function of the controller 40. When the current time is outside the permitted time slot and the vehicle 30 is traveling, for example, the controller 40 may maintain the vehicle 30 in the drivable state while causing the output interface 38 to output a warning.

The authorization information may include information on a range over which the user is permitted to move with the vehicle 30. For example, the authorization information illustrated in FIG. 3 includes information indicating an area Z1 as the range over which user A is permitted to move with the vehicle 30. The controller 40 may acquire the positional information for the vehicle 30 using the positioner 32 and judge whether the position of the vehicle 30 is included in the range over which the user is permitted to move with the vehicle 30. When it is judged that the position of the vehicle 30 is not included in the permitted range, and the vehicle 30 is not traveling, for example, then the controller 40 may place the vehicle 30 in the suspended state. When it is judged that the position of the vehicle 30 is not included in the permitted range, but the vehicle 30 is traveling, for example, then the controller 40 may maintain the vehicle 30 in the drivable state while causing the output interface 38 to output a warning.

The authorization information may include information indicating whether to allow the user to open and close the hood of the vehicle 30. For example, the authorization information illustrated in FIG. 3 indicates that user A is permitted to open and close the hood of the vehicle 30. Upon acquiring the authorization information, the controller 40 may place the hood of the vehicle 30 in a state enabling manual opening and closing when the authorization information indicates that the user is permitted to open and close the hood of the vehicle 30. Conversely, upon acquiring the authorization information, the controller 40 may place the hood of the vehicle 30 in a state disabling manual opening and closing when the authorization information indicates that the user is not permitted to open and close the hood of the vehicle 30.

<Other Example of Second Authentication Process>

When the second authentication fails, the controller 40 can use the communication interface 31 to transmit, to the second terminal apparatus 20 via the network 2, the data of the facial image of the user sitting in the driver's seat of the vehicle 30 along with a notification to confirm the authorization to be granted to the user. The controller 40 may acquire the data of the facial image of the user sitting in the driver's seat of the vehicle 30 from the camera 34.

On the second terminal apparatus 20, the controller 25 can use the communication interface 21 to receive the data of the facial image of the user along with the notification to confirm the authorization to be granted to the user from the vehicle 30 via the network 2. The controller 25 may cause the output interface 23 to output the facial image of the user along with the notification. By the data of the facial image of the user being outputted from the output interface 23, user Y can judge whether the user is an employee of company X or a suspicious person. When user Y judges that the user is an employee of company X, user Y can provide input, via the input interface 22, indicating information on the authorization to be granted to the user. The controller 25 can receive the input, via the input interface 22, indicating the authorization to be granted to the user. The controller 25 can use the communication interface 21 to transmit the information, received with the input interface 22, on the authorization to be granted to the user to the vehicle 30 via the network 2.

The controller 40 can use the communication interface 31 to receive the information on the authorization to be granted to the user from the second terminal apparatus 20 via the network 2. The controller 40 may generate or update at least a portion of the authorization information based on the received information on the authorization to be granted to the user.

<Electronic Payment Processing>

The controller 40 can perform electronic payments. The controller 40 can perform electronic payments by communicating with the communication apparatus 3 by short-range wireless communication via the communication interface 31. The controller 40 can use the communication interface 31 to receive information on the transaction target to be traded by an electronic payment and information on the payment amount for the transaction target from the communication apparatus 3 by short-range wireless communication.

The controller 40 may use preset first account information or second account information that differs from the first account information in performing the electronic payment. The first account information is, for example, the account information for company X at a financial institution. The second account information is, for example, the account information for an individual such as user A at a financial institution. As illustrated in FIG. 3, the second account information may be associated with the authentication information.

[Example of Using First Account Information]

The controller 40 may judge whether the user is authorized by the authorization information to use an electronic payment for the transaction target to be traded by an electronic payment. For example, the controller 40 may judge whether the transaction target to be traded by an electronic payment is a transaction target for which the user is granted authorization to use an electronic payment by referring to the authorization information and thereby judge whether the user has authorization to use an electronic payment for the transaction target. As another example, the controller 40 may judge whether the user has authorization to use an electronic payment for the transaction target based on the payment amount for the transaction target to be traded by an electronic payment and the upper limit on the payment amount by an electronic payment in the authorization information.

The controller 40 may use the first account information when it is judged that the user is authorized by the authorization information to use an electronic payment for the transaction target to be traded by an electronic payment. For example, the controller 40 may refer to the authorization information, and when judging that the transaction target to be traded by an electronic payment is a transaction target for which the user is authorized to use an electronic payment, the controller 40 may use the first account information. For example, when user A pays the usage fee of a toll parking lot by an electronic payment, the controller 40 refers to the authorization information illustrated in FIG. 3 and judges whether use of a toll parking lot as a transaction target is a transaction target for which user A is granted authorization to use an electronic payment. In this case, the controller 40 uses the first account information. As another example, when the authorization information includes information on the upper limit on the payment amount by each electronic payment, the controller 40 may use the first account information if it is judged that the payment amount for the transaction target to be traded by an electronic payment is equal to or less than the upper limit on the payment amount in the authorization information. When the authorization information includes information on the upper limit on the payment amount by an electronic payment during a preset period, the controller 40 may add the payment amount for the transaction target to be traded by an electronic payment to the amount already paid by an electronic payment during the period. The controller 40 may calculate the total amount over the period by adding the payment amount for the transaction target to be traded by an electronic payment to the amount already paid by an electronic payment during the period. The controller 40 may use the first account information when it is judged that the calculated total amount is equal to or less than the upper limit, in the authorization information, on the payment amount during the period.

In this way, the first account information is used when the controller 40 judges that the user is authorized to use an electronic payment. This configuration makes it unnecessary for user A to input the first account information using the input interface 37, for example, during an electronic payment. The vehicle 30 can therefore be extremely convenient for the user during an electronic payment.

The controller 40 can judge that the user is not authorized by the authorization information to use an electronic payment for the transaction target to be traded by an electronic payment. For example, the controller 40 can judge that the transaction target to be traded by an electronic payment is not a transaction target for which the user is granted authorization to use an electronic payment by referring to the authorization information. When it is judged that the transaction target to be traded by an electronic payment is not a transaction target for which the user is granted authorization to use an electronic payment, the controller 40 can judge that the user is not authorized to use an electronic payment for the transaction target to be traded by an electronic payment. For example, when user A pays the fee for fuel such as gasoline by an electronic payment, the controller 40 refers to the authorization information illustrated in FIG. 3 and judges that fuel as a transaction target is not a transaction target for which user A is granted authorization to use an electronic payment. As another example, when the authorization information includes information on the upper limit on the payment amount by each electronic payment, the controller 40 can judge that the payment amount for the transaction target to be traded by an electronic payment exceeds the upper limit on the payment amount in the authorization information. When it is judged that the payment amount for the transaction target to be traded by an electronic payment exceeds the upper limit on the payment amount in the authorization information, the controller 40 can judge that the user is not authorized to use an electronic payment for the transaction target to be traded by an electronic payment. When the authorization information includes information on the upper limit on the payment amount by an electronic payment during a preset period, the controller 40 may calculate the total amount during the period in the same way as above. When it is judged that the calculated total amount exceeds the upper limit, in the authorization information, on the payment amount during the period, the controller 40 can judge that the user is not authorized to use an electronic payment for the transaction target to be traded by an electronic payment.

Here, when it is judged that the user is not authorized by the authorization information to use an electronic payment for the transaction target to be traded by an electronic payment, the controller 40 can judge whether the transaction target satisfies a predetermined setting condition.

The setting condition may be the condition that the transaction target to be traded by an electronic payment is included among one or more particular targets that are set in advance. Particular targets may be set in advance by company X or user Y. For example, suppose that the particular target object is fuel such as gasoline. In this case, the controller 40 judges that fuel as a transaction target is not a transaction target for which user A is granted authorization to use an electronic payment, as described above. The controller 40 judges, however, that fuel as a transaction target satisfies the setting condition.

When it is judged that the transaction target satisfies the setting condition, the controller 40 may use the communication interface 31 to transmit a notification to the second terminal apparatus 20 via the network 2 to confirm whether to permit the purchase of the transaction target. For example, the controller 40 transmits a notification to the second terminal apparatus 20 to confirm whether to permit the purchase of fuel. The controller 40 may transmit identification information for the user of the vehicle 30 to the second terminal apparatus 20 together with the notification to confirm whether to permit the purchase of the transaction target.

The controller 40 can acquire the identification information for the user of the vehicle 30 by acquiring, from the memory 39, the identification information for the user associated with the authentication information used in the first authentication.

On the second terminal apparatus 20, the controller 25 can use the communication interface 21 to receive, from the vehicle 30 via the network 2, a notification to confirm whether to permit the purchase of the transaction target. The controller 25 causes the output interface 23 to output the notification to confirm whether to permit the purchase of the transaction target. By the notification being outputted from the output interface 23, user Y can judge whether the transaction target is necessary for the vehicle 30 or the work of company X. When user Y judges that the transaction target is required for the vehicle 30 or the work of company X, user Y can permit payment of the price of the transaction target to be made using the first account information. When permitting payment of the price of the transaction target to be made using the first account information, user Y can provide input, using the input interface 22, to permit the purchase of the transaction target. When input permitting the purchase of the transaction target is received from the input interface 22, the controller 25 can use the communication interface 21 to transmit a notification, to the vehicle 30 via the network 2, permitting the purchase of the transaction target. On the other hand, when user Y judges that the transaction target is not required for the vehicle 30 or the work of company X, user Y does not permit payment of the price of the transaction target to be made using the first account information. When not permitting payment of the price of the transaction target to be made using the first account information, user Y can provide input, using the input interface 22, not permitting the purchase of the transaction target. When input not permitting the purchase of the transaction target is received from the input interface 22, the controller 25 can use the communication interface 21 to transmit a notification, to the vehicle 30 via the network 2, not permitting the purchase of the transaction target.

Using the communication interface 31, the controller 40 can receive the notification permitting the purchase of the transaction target from the second terminal apparatus 20 via the network 2. When the notification is received, the controller 40 may use the first account information.

In this way, even when it is judged that the user is not authorized by the authorization information to use an electronic payment for the transaction target, the controller 40 transmits a notification to the second terminal apparatus 20, to confirm whether to permit the purchase of the transaction target, if the transaction target satisfies the setting condition. With this configuration, user Y can flexibly judge whether the transaction target is necessary for the vehicle 30 or the work of company X.

[Example of Using Second Account Information]

The controller 40 may use the second account information when it is judged that the user is not authorized by the authorization information to use an electronic payment for the transaction target to be traded by an electronic payment. When it is judged that the user is not authorized by the authorization information to use an electronic payment for the transaction target to be traded by an electronic payment, and it is judged that the transaction target does not satisfy the above-described setting condition, the controller 40 may use the second account information. For example, when user A pays a fee for candy by an electronic payment, the controller 40 judges that candy is not a transaction target for which user A is granted authorization by the authorization information illustrated in FIG. 3 to use an electronic payment. Furthermore, when the above-described particular target in the setting condition is fuel such as gasoline, the controller 40 judges that candy as the transaction target does not satisfy the setting condition and uses the second account information.

When the controller 40 transmits the above-described notification to the second terminal apparatus 20 to confirm whether to permit the purchase of the transaction target, the controller 40 can use the communication interface 31 to receive a notification not permitting the purchase of the transaction target from the second terminal apparatus 20 via the network 2. In this case, the controller 40 may use the second account information.

When it is judged that the user is not authorized by the authorization information to use an electronic payment for the transaction target, for example, the controller 40 thus uses the second account information that differs from the first account information. For example, when the user uses the electronic payment of the vehicle 30 to purchase a transaction target that is not very necessary for the vehicle 30 or the work of company X, such as candy, the second account information is used for the electronic payment. This configuration reduces the likelihood that the user will purchase a transaction target that is not very necessary for the vehicle 30 or the work of company X using funds of company X. This configuration can therefore more appropriately protect the funds of company X. Furthermore, by the controller 40 acquiring the second account information associated with the authentication information from the memory 39, the user need not input the second account information via the input interface 37. This configuration makes the vehicle 30 extremely convenient for the user during an electronic payment.

[Account Confirmation Process]

Before transmitting the account information for an electronic payment to the communication apparatus 3, the controller 40 may cause the output interface 38 to output information on the transaction target and information on the payment amount for the transaction target received from the communication apparatus 3. When the first account information is used, the controller 40 may cause the output interface 38 to output a notification indicating that the first account information is used together with information on the transaction target and the payment amount. When the second account information is used, the controller 40 may cause the output interface 38 to output a notification indicating that the second account information is used together with information on the transaction target and the payment amount. For example, user A can refer to the information outputted from the output interface 38 to confirm the account information or the like used for an electronic payment. When user A confirms the information outputted from the output interface 38 and judges to perform the electronic payment, user A can provide input instructing to perform an electronic payment to the input interface 37. When the controller 40 receives the input instructing to perform the electronic payment from the input interface 37, the controller 40 may use the communication interface 31 to transmit the first account information or the second account information to the communication apparatus 3 by short-range wireless communication.

<Process to Permit Specific Action>

Using the communication interface 31, the controller 40 can receive a notification, from the first terminal apparatus 10 by short-range wireless communication, requesting permission for a specific action not permitted by the authorization information. On the first terminal apparatus 10, user A can provide input to the input interface 12 requesting permission for a specific action not permitted by the authorization information as needed in an emergency, for example. Upon receiving the input via the input interface 12 on the first terminal apparatus 10, the controller 15 can use the communication interface 11 to transmit a notification, to the vehicle 30 via the network 2, requesting permission for a specific action not permitted by the authorization information.

Upon receiving a notification requesting permission for a specific action that is not permitted by the authorization information, the controller 40 may use the communication interface 31 to transmit a notification confirming whether to permit the specific action to the second terminal apparatus 20 via the network 2. The controller 40 may transmit the identification information for the user of the vehicle 30 to the second terminal apparatus 20 along with the notification to confirm whether to permit the specific action. The controller 40 may treat the identification information for the user of the first terminal apparatus 10, received by the communication interface 11 from the first terminal apparatus 10 by short-range wireless communication, as the identification information for the user of the vehicle 30. The controller 40 may acquire the identification information for the user of the vehicle 30 from the memory 39, as described above.

On the second terminal apparatus 20, the controller 25 can use the communication interface 21 to receive the identification information for the user of the vehicle 30 along with the notification requesting permission for a specific action not permitted by the authorization information from the vehicle 30 via the network 2. Upon receiving the notification and the like, the controller 25 may cause the output interface 23 to output the notification and the identification information for the user of the vehicle 30. By the notification and the like being outputted by the output interface 23, user Y can learn that the user of the vehicle 30, i.e. user A, is requesting permission for the specific action, for example. When permitting user A to perform the specific action, user Y can provide input, via the input interface 22, permitting the specific action. Upon receiving input permitting the specific action from the input interface 22, the controller 25 may use the communication interface 21 to transmit a notification permitting the specific action to the vehicle 30 via the network 2. On the other hand, when not permitting user A to take the specific action, user Y can provide input not permitting the specific action to the input interface 22. Upon receiving input not permitting the specific action from the input interface 22, the controller 25 may use the communication interface 21 to transmit a notification not permitting the specific action to the vehicle 30 via the network 2.

When the controller 40 uses the communication interface 31 to receive the notification, from the second terminal apparatus 20 via the network 2, permitting the specific action not permitted by the authorization information, the controller 40 may enable performance of the specific action. When the controller 40 uses the communication interface 31 to receive the notification, from the second terminal apparatus 20 via the network 2, not permitting the specific action not permitted by the authorization information, the controller 40 may disable performance of the specific action.

<Other Example of Process to Permit Specific Action>

Using the communication interface 31, the controller 40 can receive, from the server 4 via the network 2, a request to permit the user of the vehicle 30 to perform a specific action. In this case, the controller 40 may permit the user to take the specific action even if the specific action is not permitted by the authorization information. The server 4 may be set in advance by company X, for example. The server 4 is, for example, managed by a public institution.

For example, as illustrated in FIG. 3, suppose that the range over which user A is permitted to move with the vehicle 30 is limited to area Z1 by the authorization information. Further suppose that due to the occurrence of a disaster in area Z1, a public institution wishes to evacuate user A to area Z2. In this case, the public institution can transmit a request to the vehicle 30, via the server 4, to permit user A to move from area Z1 to area Z2 with the vehicle 30 as a specific action. When the request is received, the controller 40 permits user A to move from area Z1 to area Z2 with the vehicle 30 even if the range over which user A is permitted to move with the vehicle 30 is limited to area Z1 by the authorization information.

When a specific action is not permitted by the authorization information but the controller 40 permits the user to take the specific action, the controller 40 may use the communication interface 31 to transmit a notification, to the second terminal apparatus 20 via the network 2, indicating that the user is permitted to take the specific action. The controller 40 may transmit the identification information for the user of the vehicle 30 along with the notification to the second terminal apparatus 20. The controller 40 can acquire the identification information for the user of the vehicle 30 in the same way as described above.

On the second terminal apparatus 20, the controller 25 can use the communication interface 21 to receive, from the vehicle 30 via the network 2, a notification indicating that the user is permitted to take the specific action and the identification information for the user of the vehicle 30. Upon receiving the notification and the like, the controller 25 may cause the output interface 23 to output an indication that the user is permitted to take the specific action and the identification information for the user of the vehicle 30. This configuration enables user Y to learn that the user has been permitted to take the specific action.

<Update Process>

The controller 40 may automatically update the expiration date of the authentication information when the expiration date set in the authentication information is reached. Here, before the expiration date set in the authentication information is reached, the controller 40 may use the communication interface 31 to transmit a preliminary notification indicating the automatic updating of the authentication information to the second terminal apparatus 20 via the network 2. The controller 40 may transmit the preliminary notification indicating the automatic updating of the authentication information before the expiration date is reached by transmitting the preliminary notification at a set time prior to the expiration date. The set time may be set in advance in accordance with the length of the expiration date. The set time is, for example, one month when the expiration date is one year.

On the second terminal apparatus 20, the controller 25 can use the communication interface 21 to receive the preliminary notification indicating the automatic updating of the authentication information from the vehicle 30 via the network 2. Upon receipt of the preliminary notification, the controller 25 may cause the output interface 23 to output the preliminary notification. By the preliminary notification being outputted from the output interface 23, user Y can learn that the expiration date of the authentication information is about to be reached. Upon learning that the expiration date of the authentication information is about to be reached, user Y can review the content of the authorization information associated with the authentication information. When user Y wishes to change the content of the authorization information, user Y can provide input to the input interface 22 instructing to change the content of the authorization information. Upon receiving, via the input interface 22, the input instructing to change the content of the authorization information, the controller 25 can use the communication interface 21 to transmit a notification instructing to change the content of the authorization information to the vehicle 30 via the network 2. When user Y wishes to change the expiration date, user Y can provide input to the input interface 22 instructing to change the expiration date. Upon receiving, via the input interface 22, the input instructing to change the expiration date, the controller 25 may use the communication interface 21 to transmit a notification instructing to change the expiration date to the vehicle 30 via the network 2.

The controller 40 can use the communication interface 31 to receive the notification instructing to change the content of the authorization information from the second terminal apparatus 20 via the network 2. When the notification is received, the controller 40 may change the content of the authorization information stored in the memory 39 based on the notification.

The controller 40 can use the communication interface 31 to receive the notification instructing to change the expiration date from the second terminal apparatus 20 via the network 2. When the notification is received, the controller 40 may change the expiration date of the authorization information based on the notification.

(Authentication System Operations)

Figure 4:
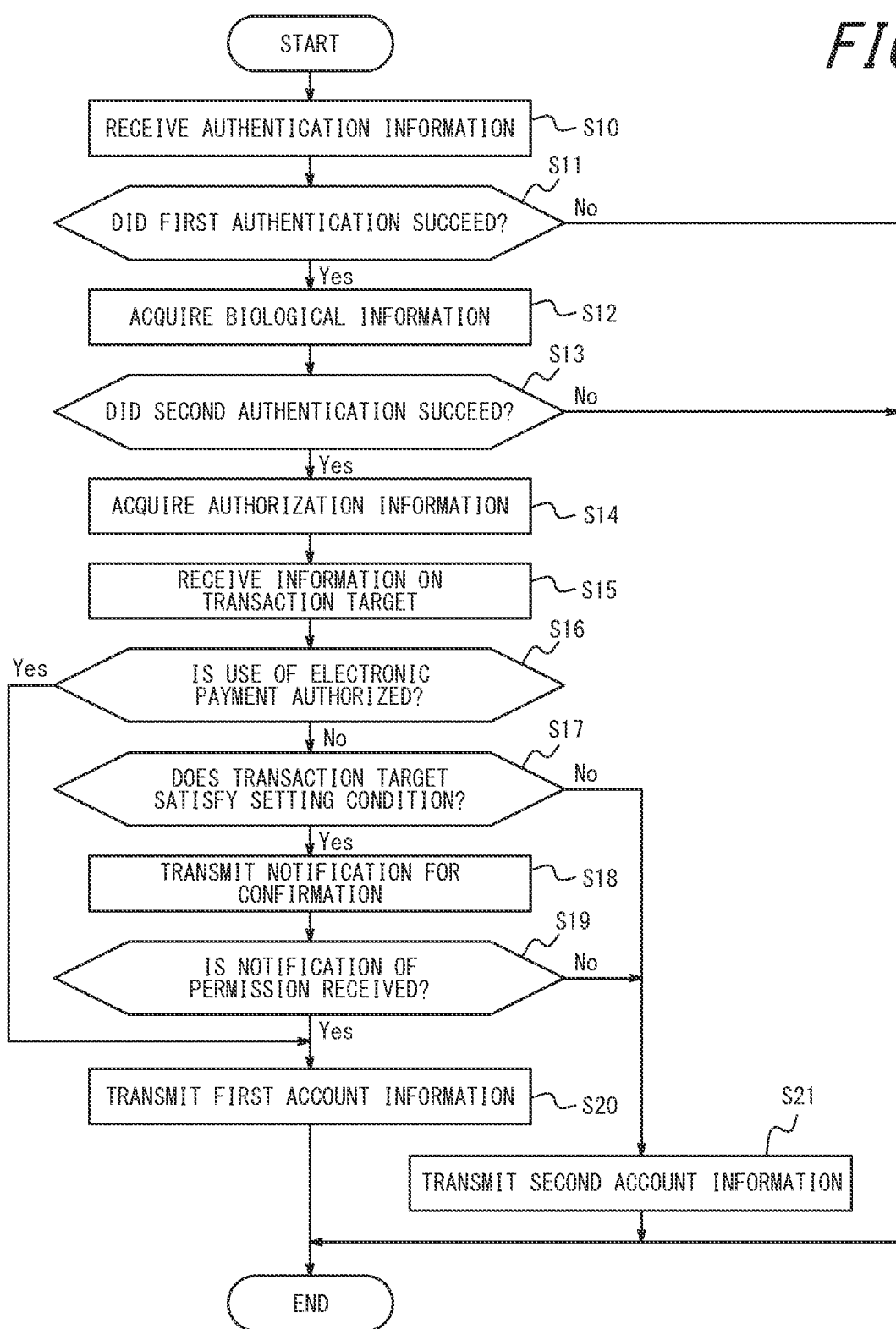
FIG. 4 is a flowchart illustrating operations for authentication processing and the processing of an electronic payment in the authentication system illustrated in FIG. 1.

An example of operations for the authentication process and the electronic payment process of the authentication system 1 illustrated in FIG. 1 are now described with reference to FIG. 4. These operations correspond to an example of the authentication method according to the present embodiment. FIG. 4 is a flowchart mainly illustrating operations of the vehicle 30. Upon the start of short-range wireless communication between the first terminal apparatus 10 and the vehicle 30, the controller 40 of the vehicle 30 can begin a process such as the one as illustrated in FIG. 4.

The controller 40 uses the communication interface 11 to receive authentication information from the first terminal apparatus 10 by short-range wireless communication (step S10). The controller 40 performs first authentication using the received authentication information. The controller 40 judges whether the first authentication has succeeded (step S11). When the controller 40 judges that the first authentication has succeeded (step S11: Yes), the process proceeds to step S12. Conversely, when the controller 40 judges that the first authentication has failed (step S11: No), the controller 40 terminates the authentication process.

In the process of step S12, the controller 40 acquires the biological information for the user riding in the vehicle 30 from the sensor 33. The controller 40 performs second authentication using the acquired biological information. The controller 40 judges whether the second authentication has succeeded (step S13). When the controller 40 judges that the second authentication has succeeded (step S13: Yes), the process proceeds to step S14. Conversely, when the controller 40 judges that the second authentication has failed (step S13: No), the controller 40 terminates the authentication process.

In the process of step S14, the controller 40 acquires the authorization information associated with the authentication information from the memory 39. After executing the process of step S14, the controller 40 can perform an electronic payment by communicating with the communication apparatus 3 by short-range wireless communication via the communication interface 31.

In the process of step S15, the controller 40 uses the communication interface 31 to receive information on the transaction target to be traded by an electronic payment and the payment amount for the transaction target from the communication apparatus 3 by short-range wireless communication. In the process of step S16, the controller 40 judges whether the user is authorized by the authorization information to use an electronic payment for the transaction target to be traded by an electronic payment. When the controller 40 judges that the user is authorized to use an electronic payment for the transaction target (step S16: Yes), the process proceeds to step S20. Conversely, when the controller 40 judges that the user is not authorized to use the electronic payment for the transaction target (step S16: No), the process proceeds to step S17.

In the process of step S17, the controller 40 judges whether the transaction target to be traded by an electronic payment satisfies a setting condition. When the controller 40 judges that the transaction target satisfies the setting condition (step S17: Yes), the process proceeds to step S18. In the process of step S18, the controller 40 uses the communication interface 31 to transmit a notification to the second terminal apparatus 20 via the network 2 to confirm whether to permit the purchase of the transaction target. Conversely, when the controller 40 judges that the transaction target does not satisfy the setting condition (step S17: No), the process proceeds to step S21.

In the process of step S19, the controller 40 judges whether a notification permitting the purchase of the transaction target has been received by the communication interface 31 from the second terminal apparatus 20 via the network 2. When the controller 40 judges that a notification permitting the purchase of the transaction target has been received from the second terminal apparatus 20 (step S19: Yes), the process proceeds to step S20. Conversely, when the controller 40 judges that a notification permitting the purchase of the transaction target has not been received from the second terminal apparatus 20 (step S19: No), the process proceeds to step S21. For example, when the controller 40 receives a notification from the second terminal apparatus 20 that the purchase of the transaction target is not permitted, the controller 40 judges that a notification permitting the purchase of the transaction target has not been received from the second terminal apparatus 20.

In the process of step S20, the controller 40 transmits the first account information to the communication apparatus 3 by short-range wireless communication via the communication interface 31. In the process of step S21, the controller 40 transmits the second account information to the communication apparatus 3 by short-range wireless communication via the communication interface 31.

An example of operations for processing to permit a specific action and update processing in the authentication system 1 illustrated in FIG. 1 is now described with reference to FIG. 5. These operations correspond to an example of the authentication method according to the present embodiment. FIG. 5 is a flowchart mainly illustrating operations of the vehicle 30.

Using the communication interface 31, the controller 40 receives a notification, from the first terminal apparatus 10 by short-range wireless communication, requesting permission for a specific action not permitted by the authorization information (step S30). Upon receiving a notification requesting permission for a specific action that is not permitted by the authorization information, the controller 40 uses the communication interface 31 to transmit a notification confirming whether to permit the specific action to the second terminal apparatus 20 via the network 2 (step S31).

The controller 40 judges whether a notification permitting the specific action not permitted by the authorization information has been received from the second terminal apparatus 20 via the network 2 using the communication interface 31 (step S32). When it is judged that a notification permitting the specific action has been received (step S32: Yes), the controller 40 enables performance of the specific action (step S33). Conversely, when it is judged that a notification permitting the specific action has not been received (step S32: No), the controller 40 disables performance of the specific action (step S34). For example, when the controller 40 receives a notification from the second terminal apparatus 20 that the purchase of the transaction target is not permitted, the controller 40 judges that a notification permitting the purchase of the transaction target has not been received from the second terminal apparatus 20.

Before the expiration date set in the authentication information is reached, the controller 40 uses the communication interface 31 to transmit a preliminary notification indicating the automatic updating of the authentication information to the second terminal apparatus 20 via the network 2 (step S35). When the controller 40 uses the communication interface 31 to receive a notification instructing to change the content of the authorization information from the second terminal apparatus 20 via the network 2, the controller 40 changes the content of the authorization information stored in the memory 39 based on the notification (step S36). When the controller 40 uses the communication interface 31 to receive a notification instructing to change the expiration date from the second terminal apparatus 20 via the network 2, the controller 40 changes the expiration date of the authentication information based on the notification (step S47).

In this way, the controller 40 in the authentication system 1 acquires authorization information indicating authorization to perform an electronic payment for the user when a first authentication using the authentication information received from the first terminal apparatus 10 succeeds and a second authentication using the biological information acquired from the sensor 33 succeeds. In other words, the controller 40 in the present embodiment performs two-stage authentication consisting of the first authentication and the second authentication. The security of the vehicle 30 can be further enhanced by the performance of two-stage authentication, i.e. the first authentication and the second authentication. In the present embodiment, when the two-stage authentication (first authentication and second authentication) succeeds, the controller 40 acquires the authorization information indicating authorization to perform the electronic payment for the user. By the authorization information being acquired by the controller 40 when the two-stage authentication (first authentication and second authentication) succeeds, the security of electronic payments performed in the vehicle 30 can be enhanced. According to the present embodiment, technology for performing authentication in the vehicle 30 can therefore be improved.

The present disclosure is not limited to the embodiments described above. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

For example, in the above-described embodiment, the second account information has been described as being stored in the memory 39 in association with the authentication information, as illustrated in FIG. 3. However, the second account information need not be stored in the memory 39 in association with the authentication information. For example, the controller 40 may use account information received via the communication interface 31 from the first terminal apparatus 10 by short-range wireless communication as the second account information when performing an electronic payment. As another example, the controller 40 may use account information received by the input interface 37 as the second account information when performing an electronic payment. The user of the vehicle 30 may, for example, transmit account information to the vehicle 30 by the first terminal apparatus 10 or input account information via the input interface 37 of the vehicle 30 when the user purchases something unrelated to work by an electronic payment performed by the vehicle 30.

In the above-described embodiment, the controller 40 has, for example, been described as causing the output interface 38 to output information on the transaction target, and information on the payment amount for the transaction target, received from the communication apparatus 3. The controller 40 may cause the output interface 38 to output any appropriate information received by the communication interface 31 from the communication apparatus 3 by short-range wireless communication. For example, when the vehicle 30 is being refueled with gasoline or the like, the controller 40 can receive information on the refueling status from the communication apparatus 3 during the refueling. The controller 40 may cause the output interface 38 to provide information on the refueling status.

In the above-described embodiment, the controller 40 has, for example, been described as transmitting a notification for confirming whether to permit the purchase of the transaction target to the second terminal apparatus 20 via the network 2 using the communication interface 31 in the process of step S18 illustrated in FIG. 4. The controller 40 may, however, transmit such a notification to an apparatus other than the second terminal apparatus 20. For example, the controller 40 may refer to the authorization information illustrated in FIG. 3 to identify a user who has been authorized to use an electronic payment for the transaction target. The controller 40 may then transmit the notification to the terminal apparatus of the user via the network 2 using the communication interface 31. The controller 40 may use the first account information when a notification permitting the purchase of the transaction target is received, by the communication interface 31, from the terminal apparatus of the user via the network 2. On the other hand, the controller 40 may use the second account information when a notification not permitting the purchase of the transaction target is received, by the communication interface 31, from the terminal apparatus of the user via the network 2.

The invention claimed is:

1. A vehicle comprising:
   a communication interface;
   a sensor configured to detect biological information for a user of the vehicle; and
   a controller configured to:
   receive authentication information from a first terminal apparatus by short-range wireless communication using the communication interface;

perform a first authentication of a first user based on the authentication information;
determine whether the first authentication succeeds; and
upon determination that the first authentication succeeds:
unlock a door of the vehicle;
acquire first biological information associated with the first user from the sensor;
acquire second biological information associated with the authentication information used in the first authentication from a memory;
perform a second authentication of the first user by comparing the first biological information and the second biological information;
determine whether the second authentication succeeds; and
upon determination that the second authentication succeeds, receive authorization information associated with the first user and authorize an electronic payment to be made by the first user based on the authorization information.

2. The vehicle of claim 1, wherein the controller is configured to use first account information set in advance or second account information different from the first account information in performing the electronic payment.

3. The vehicle of claim 2, wherein the controller is configured to use the first account information when it is judged that the user is authorized by the authorization information to use the electronic payment for a transaction target to be traded by the electronic payment.

4. The vehicle of claim 3, wherein
when it is judged that the user is not authorized by the authorization information to use the electronic payment for the transaction target to be traded by the electronic payment, and it is judged that the transaction target satisfies a setting condition set in advance, the controller is configured to use the communication interface to transmit a notification to confirm whether to permit purchase of the transaction target to a second terminal apparatus set in advance, and
the controller is configured to use the first account information when a notification permitting the purchase of the transaction target is received by the communication interface from the second terminal apparatus.

5. The vehicle of claim 1, wherein the authorization information includes information on a transaction target for which the user is granted permission to use the electronic payment.

6. The vehicle of claim 1, wherein the authorization information includes information on an upper limit of a payment amount by the electronic payment.

7. The vehicle of claim 2, wherein the controller is configured to use the second account information in performing the electronic payment when the second account information is received by the communication interface.

8. The vehicle of claim 1, wherein the authorization information further includes information indicating whether to permit the user to operate the vehicle, information on a time slot in which the user is permitted to operate the vehicle, information on a range over which the user is allowed to move the vehicle, and/or information indicating whether to permit the user to open and close a hood of the vehicle.

9. The vehicle of claim 1, wherein
the biological information includes data of a facial image of the user, and
when the second authentication fails, the controller is configured to use the communication interface to transmit the data of the facial image of the user, together with a notification to confirm authorization granted to the user, to a second terminal apparatus set in advance.

10. The vehicle of claim 1, wherein
when a notification requesting permission for a specific action not permitted by the authorization information is received from the first terminal apparatus by the communication interface, the controller is configured to transmit a notification to confirm whether to permit the specific action to a second terminal apparatus set in advance, and
when a notification permitting the specific action is received from the second terminal apparatus by the communication interface, the controller is configured to enable performance of the specific action.

11. The vehicle of claim 1, wherein when a request to permit the user to perform a specific action is received by the communication interface from a server set in advance, the controller is configured to permit the user to perform the specific action even when the specific action is not permitted by the authorization information.

12. The vehicle of claim 11, wherein when the specific action is not permitted by the authorization information, but the user is permitted to perform the specific action, the controller is configured to use the communication interface to transmit a notification indicating that the user is permitted to perform the specific action to a second terminal apparatus set in advance.

13. The vehicle of claim 1, wherein an expiration date is set in advance in the authentication information.

14. The vehicle of claim 13, wherein the controller is configured to use the communication interface, before the expiration date is reached, to transmit a preliminary notification indicating automatic updating of the authentication information to a second terminal apparatus set in advance.

15. The vehicle of claim 14, wherein when a notification instructing to change a content of the authorization information is received from the second terminal apparatus, the controller is configured to change the authorization information based on the notification instructing to change the content of the authorization information.

16. The vehicle of claim 14, wherein when a notification instructing to change the expiration date is received by the communication interface from the second terminal apparatus, the controller is configured to change the expiration date based on the notification instructing to change the expiration date.

17. An authentication system comprising:
the vehicle of claim 1; and
the first terminal apparatus.

18. A non-transitory computer readable medium storing a program executable by a computer to cause the computer to execute operations comprising:
receiving authentication information from a first terminal apparatus by short-range wireless communication;
performing a first authentication of a first user based on the authentication information;
determining whether the first authentication succeeds; and
upon determination that the first authentication succeeds:
unlocking a door of a vehicle;
acquiring first biological information associated with the first user from a sensor;
acquiring second biological information associated with the authentication information used in the first authentication from a memory;

performing a second authentication of the first user by comparing the first biological information and the second biological information;

determining whether the second authentication succeeds; and upon determination that the second authentication succeeds, receiving authorization information associated with the first user and authorize an electronic payment to be made by the first user based on the authorization information.

19. An authentication method comprising:

receiving, by a vehicle, authentication information from a first terminal apparatus by short-range wireless communication;

performing a first authentication of a first user based on the authentication information;

determining whether the first authentication succeeds; and upon determination that the first authentication succeeds:

unlocking a door of a vehicle;

acquiring first biological information associated with the first user from a sensor;

acquiring second biological information associated with the authentication information used in the first authentication from a memory;

performing a second authentication of the first user by comparing the first biological information and the second biological information;

determining whether the second authentication succeeds; and upon determination that the second authentication succeeds, receiving authorization information associated with the first user and authorize an electronic payment to be made by the first user based on the authorization information.

* * * * *